United States Patent [19]
Trabert et al.

[11] Patent Number: 5,318,737
[45] Date of Patent: Jun. 7, 1994

[54] FEEDBLOCK COEXTRUSION OF MODIFIED ACRYLIC CAPSTOCK

[75] Inventors: Loren D. Trabert, Richboro; Robert L. Post, Ivyland; Edward G. Ludwig, Bensalem, all of Pa.

[73] Assignee: Rohm and Haas Company, Philadelphia, Pa.

[21] Appl. No.: 975,152

[22] Filed: Nov. 12, 1992

Related U.S. Application Data

[63] Continuation of Ser. No. 669,249, Mar. 14, 1991, abandoned, which is a continuation-in-part of Ser. No. 532,044, May 25, 1990, abandoned.

[51] Int. Cl.$^5$ .............................................. B29C 47/06
[52] U.S. Cl. ............................. 264/171; 264/177.17; 264/331.18; 425/133.5
[58] Field of Search ................ 264/171, 177.1, 177.17, 264/177.19, 331.18; 425/131.1, 133.5, 462

[56] References Cited

U.S. PATENT DOCUMENTS

| | | | |
|---|---|---|---|
| 3,476,627 | 11/1969 | Squires | 156/244 |
| 3,557,265 | 1/1971 | Chisholm et al. | 264/47 |
| 3,607,615 | 9/1971 | Hatakeyama et al. | 161/218 |
| 3,642,752 | 2/1972 | Sutter | 425/203 |
| 3,793,402 | 2/1974 | Owens | 260/876 |
| 3,882,219 | 5/1975 | Wiley | 264/171 |
| 3,918,865 | 11/1975 | Nissel | 425/131 |
| 3,933,964 | 1/1976 | Brooks | 264/171 |
| 4,100,243 | 7/1978 | Wissinger et al. | 264/171 |
| 4,101,702 | 7/1978 | Churchill et al. | 264/171 |
| 4,144,011 | 3/1979 | Sponaugle | 425/133.5 |
| 4,183,777 | 1/1980 | Summers et al. | 156/243 |
| 4,187,270 | 2/1980 | Bartrum | 264/171 |
| 4,189,520 | 2/1980 | Gauchel | 428/520 |
| 4,204,821 | 5/1980 | Gauchel et al. | 425/131 |
| 4,296,062 | 10/1981 | Gauchel et al. | 264/173 |
| 4,483,812 | 11/1984 | Hahn et al. | 425/131.1 |
| 4,731,213 | 3/1988 | Klepsch | 264/512 |
| 4,856,975 | 8/1989 | Gearhart | 264/177.1 |
| 5,055,346 | 10/1991 | Rohrbacher | 428/520 |

FOREIGN PATENT DOCUMENTS 210450 6/1986 European Pat. Off. .
63-254114 10/1988 Japan .

OTHER PUBLICATIONS

Nissel, F. R., "Sheet Co-Extrusion After 15 Years-1981 Status Report", pp. 14–19, in Advances in Plastics Technology, Oct., 1981.

Rohm and Haas Company's Technical Literature, "Coextruded Plexiglas (TM) DR (TM)/ABS Composites", dated approximately 1977.

"Coextruded Plexiglas DR/ABS/Composites"; 1977.

*Primary Examiner*—Jeffery Thurlow
*Attorney, Agent, or Firm*—Richard A. Haggard

[57] ABSTRACT

A method for preparing a plastic composite by feedblock coextrusion of a molten acrylic based capstock overlying and integrally bonded to an underlying structural plastic ply. The composition of the capstock contains from about 40 to about 88 wt. % of an acrylic polymer having a molecular weight of at least about 125,000 daltons, and from about 12 to about 60 wt. % of an acrylate-based impact modifier resin in the form of discrete multi-layered polymeric particles. The capstock composition has a melt flow index of about 0.4 to about 0.75 grams/10 minutes (ASTM Method D-1238, Condition I) and the underlying structural ply has substantially the same melt flow index as that of the capstock composition.

11 Claims, No Drawings

FEEDBLOCK COEXTRUSION OF MODIFIED ACRYLIC CAPSTOCK

This is a continuation of U.S. patent application Ser. No. 07/669,249, filed Mar. 14, 1991, now abandoned, which is a continuation-in-part of U.S. patent application Ser. No. 532,044, filed May 25, 1990, now abandoned.

FIELD OF THE INVENTION

This invention is in the field of capstock for plastics. More particularly, this invention relates to resin compositions which are especially useful as capstock materials for coextrusion over or lamination to structural plastics, as well as to the manufacture of such composites and to the articles produced therefrom.

Certain structural plastics, such as acrylonitrile/butadiene/styrene (ABS) resins, poly(vinyl chloride) (PVC) resins, and the like, exhibit attractive mechanical properties when extruded, molded, or formed into various articles of manufacture. Such articles include, for example, bathtubs, shower stalls, counters, and storage facilities. Although these structural plastics are strong, tough and relatively inexpensive, the properties of their exposed surfaces are less than ideal. That is, the surfaces of the structural plastics are degraded by light; they can be easily scratched; they are eroded by common solvents, affected adversely by water, etc.

Consequently, it has become a practice in the industry to apply another resinous material over the structural plastic to protect the underlying structural material and provide a surface that can withstand abuse associated with the use environment. Such surfacing materials are called "capstocks". The capstock generally is much thinner than the structural plastic, typically being about 10 to about 25% of the total thickness of the composite comprising the capstock and structural plastic plies. For example, the thickness of the capstock can be about 0.2 to about 2.5 mm, whereas the thickness of the structural plastic ply can be about 1.5 to about 10 mm.

As a class, acrylic resins, known for their excellent optical characteristics, resistance to degradation by sunlight, hardness, inertness to water and common chemicals, durability, and toughness, are capstocks of choice for various structural plastics, such as ABS sheet. The mechanical properties of the capstock generally are secondary to those of the structural plastic, but it is important that the capstock not adversely affect the mechanical properties of the composite.

A resinous capstock, including one comprising an acrylic resin, can be applied to a structural plastic in several different ways. For example, preformed sheets or films of the structural plastic and the capstock can be laminated together, as by thermal fusion, by press lamination, or by lamination via an appropriate adhesive or via a mutually compatible polymer interlayer. (A commercially available product of this type has been produced by Rohm and Haas Company under the trademark KORAD.) Other methods of lamination, such as co-calendering or bi-extrusion or even solution or dispersion casting, can be used to laminate structural plastics and an acrylic capstock. Alternatively, in appropriate cases, the structural plastic and an acrylic capstock can be coextruded, particularly feedblock coextruded, and this is often a choice method when the laminate is an acrylic-capped ABS sheet. A sheet of the composite can then be thermoformed into an article such as a bathtub, a shower stall, a counter top, etc.

The technique for producing a sheet of such composite by feedblock coextrusion is described, for example, in U.S. Pat. Nos. 3,476,627; 3,557,265; and 3,918,865. Equipment for such coextrusion is widely available in the industry. The term "feedblock coextrusion," as used herein, refers to a process in which each of a resin supply of a first plastic material (for example, a structural plastic material) and a resin supply of a second plastic material (for example, a capstock material) is heated to a molten condition as separated streams thereof are fed to a feedblock in which the streams are brought together in face to face surface contact to form a two-ply stream which in turn is fed to a sheet die in which the two-ply stream is spread laterally into a two-ply sheet under conditions of laminar flow, with the molten resin plies of the sheet being in face to face surface contact as they emerge from the die, the shaped two-ply sheet thereafter being cooled and solidified, the resultant composite comprising each of the plies of the sheet integrally bonded to each other by the solidified resins comprising the sheet. As is known in the art, the process of feedblock coextrusion can be used to produce a sheet of more than two plies by use of a feedblock which is designed to accommodate more than two streams of resin. In a process for forming a two- or higher-ply sheet, the edges of the sheet are usually trimmed, and ideally, the trimmings are recycled into the structural plastic feed to conserve material and realize economies.

Several conditions should be satisfied in practicing this feedblock coextrusion process. The structural plastic and the capstock should be chemically compatible at the extrusion temperature. Secondly, there should be a natural adhesive link produced between the layers. In addition, the molten resins should have approximately the same viscosity. The viscosity match is important to proper flow conditions in the feedblock and die. Typically, the lower viscosity resin flows more and tends to encapsulate the higher viscosity resin. A particular problem can be the flow of capstock material to the edges of the sheet.

It should be appreciated that the resinous material comprising the capstock must have a combination of properties, including processing properties and other physical, chemical, and aesthetic properties, for it to be a suitable material for capstock. Similarly, it should be appreciated that the structural plastic, or underlayer or substrate, over which the capstock is applied, also must have a combination of properties, including processing and other physical, chemical, and aesthetic properties, for it to be a suitable material for a structural plastic.

The present invention relates to an acrylic resin composition which is particularly suitable for use as capstock in an application which involves the formation of a sheet of plastic composite by the technique of feedblock coextrusion. It is particularly related to the provision of an acrylic resin composition which has a relatively high viscosity which enables one to form the composition into capstock and avoid the problem of excessive edge flow in a manufacturing process which involves flat-sheeted coextrusion.

PRIOR ART

An acrylic resinous composition presently used in the manufacture of capstock comprises a major amount of a copolymer of methyl methacrylate and ethyl acrylate and a minor amount of multi-layered polymeric particles of the type described in U.S. Pat. No. 3,793,402.

Although composites comprising capstock made from such a resinous composition and ABS structural plastic have satisfactory physical, chemical and aesthetic properties, there are disadvantages associated with the use of such materials in producing the composite by the techniques of feedblock coextrusion. For example, it has been found that the properties of such composites are affected adversely when the manufacturing process includes the step of recycling to the structural plastic feed the trimmed edges of the composite. In this connection, it has been observed that when certain grades of the molten ABS are more viscous than the acrylic resinous material at the temperature of extrusion, this combination leads to the edges of the composite having a relatively high amount of acrylic resinous material. It has been found that the mechanical properties of a composite are adversely affected when the composite is made under circumstances which involve the edge portions of a previously-made sheet of composite being trimmed and recycled to the ABS feed.

Disclosures in the prior art suggest that the aforementioned problem can be overcome by increasing the temperature of the higher viscosity component, i.e., the ABS, during the extrusion (see Advances in Plastics Technology, October 1981, pp. 14-19). However, this has the disadvantage that some plastics, for example, poly(vinyl chloride) and butadiene-based structural plastics, may be thermally degraded, thus, adversely affecting their physical properties. Heating the higher viscosity component also may have the disadvantage of requiring more complex equipment associated with heating, holding, and separately feeding molten plastics at different temperatures. For example, coextrusion of methyl methacrylate homo- and copolymers with molecular weights of 120,000 to 180,000 in thin layers over a die-shaped structural profile member of PVC is claimed in U.S. Pat. No. 4,189,520. In the '520 disclosure, use is made of temperature differential and die-adjustability to achieve a desired coextrusion result with materials of different rheological properties.

The prior art contains other general disclosures concerning the nature of compositions comprising a composite formed from an acrylic resin capstock and ABS substrate. Thus, U.S. Pat. No. 4,731,213 discloses that, unless the viscosities of an acrylic resin and ABS resin are comparable at a given temperature, difficulties are encountered in the process of joining the materials together. By way of example, the '213 patent discloses an acrylic resin/ABS resin composite prepared from compositions whose melt flow index (MFI 230° C./3.8, measured according to DIN 53735) are each about 6. However, the '213 patent discloses further that the properties of bathtubs made from such composite and using conventional equipment were at best mediocre in that testing revealed the formation of visible fissures in the acrylic resin capstock within a relatively short period of time upon subjecting the material to hot/cold temperatures.

According to the '213 patent, important advantages are realized by utilizing an acrylic resin that has an MFI substantially below 6, that is, no more than about 2. The patent discloses that a sheet of composite which includes an acrylic resin having an MFI of no more than about 2 can be deep-drawn into bathtubs which exhibit superior resistance to hair line fissures or hazing caused by hydrothermal stress (i.e., alternate exposure to hot and cold water). However, in order to achieve such results, it is necessary, according to the disclosure of the '213 patent, to use a special multi-manifold coextrusion sheet die which is said to allow coextrusion of a composite sheet from molten ABS having an MFI of about 6 and acrylic resin having an MFI of about 2, that is, from two resins whose MFI's are substantially different. The '213 patent further suggests that the coextrusion of acrylic glasses of low melt flow index and ABS by conventional methods, such as a feedblock type of coextrusion, was not possible and that only by means of a multi-channel die could coextrusion of such materials be accomplished. To realize the benefits of the development described in the '213 patent, a manufacturer would have to incur a capital expenditure in the acquisition of new equipment.

Others have coextruded methyl methacrylate homo- and copolymers by way of special coextrusion processes or devices, for example, by the multi-manifold type extrusion device for profiled articles claimed in U.S. Pat. No. 4,204,821 and the process in U.S. Pat. No. 4,296,062. Previous inventors have not suggested or used the composition of the present invention to provide capstocks via feedblock coextrusion, especially for sheet laminates and other non-profiled type materials over low melt flow substrates.

The present invention relates to the provision of resin compositions which can be employed as capstock for ABS and similar structural plastics in composites which can be formed readily by use of feedblock coextrusion. The present invention relates also to a resin composition which can be used to form capstock having improved properties, especially chemical-resistant properties.

SUMMARY OF THE INVENTION

In accordance with the present invention, there is provided a plastic composite formed by feedblock coextrusion and comprising capstock overlying and integrally bonded to an underlying structural plastic ply, the capstock composition comprising:

(A) from about 40 to about 88 wt. % of a thermoplastic resin having a molecular weight of at least about 125,000 daltons, and selected from the group consisting of a methyl methacrylate resin and a copolymer of methyl methacrylate and a C1 to C4 alkyl acrylate; and (B) from about 12 to about 60 wt. % of an acrylate-based impact-modifier resin in the form of discrete particles;

wherein said composition has a melt flow index of from about 0.4 to about 0.75 and wherein the discrete particles are dispersed in the thermoplastic resin which constitutes a continuous phase of said composition.

As used herein, the term "molecular weight" means weight average molecular weight. Molecular weight is estimated by conventional gel permeation chromatographic methods, using poly(methyl methacrylate) standards for calibration. The term "dalton" means atomic mass unit. One of the characteristics which distinguish the capstock composition of the present invention from capstock compositions of the prior art is the use in the present invention of a relatively high molecular weight thermoplastic resin.

In preferred form, the capstock composition of the present invention comprises, as the aforementioned thermoplastic resin, a copolymer prepared by polymerizing a major amount of methyl methacrylate with a minor amount of lower alkyl acrylate, most preferably ethyl acrylate, with the molecular weight of the copolymer being from no greater than 220,000 daltons and preferably about 135,000 to about 155,000 daltons, most preferably, from about 140,000 to about 150,000 daltons.

In preferred form, the aforementioned acrylate-based impact-modifier resin comprises multi-layered resin particles of the type described in U.S. Pat. No. 3,793,402.

Another aspect of the present invention comprises a resin composition of the type described above in which the impact-modifier resin comprises multi-layered polymeric particles composed of the following three sequential stages: (1) a non-elastomeric first stage polymer comprising a core layer; (2) an elastomeric second stage polymer comprising an intermediate layer; and (3) a relatively hard third stage polymer comprising an outer layer; wherein each of the core layer and the outer layer comprises a resin which is made from the same monomer(s) used to prepare the aforementioned thermoplastic resin component of the composition, and wherein the intermediate layer is linked with the core layer and with the outer layer by allyl methacrylate graft-linking monomer. The use of an impact modifier resin of this type provides a composition which is capable of being formed into a product that has particularly good properties, including, for example, products with a high flexural modulus and high Izod impact strength.

Such resin composition can be extruded, molded, formed, or cast into monolithic sheets or films, including capstock, using conventional equipment. Structural plastics, for example, ABS sheet, PVC, modified styrene polymers, polycarbonate, and polycarbonate-ABS blends, can be capped with the aforesaid polymeric resin composition by employing standard lamination or feedblock coextrusion techniques and equipment. Articles comprising such composites are also within the scope of this invention.

The improved capstock composition of the present invention provides resistance to chemicals, e.g., swimming pool chemicals, resistance to hydrothermal stress, and thermal resistance, which are superior to similar capstock materials now in use. In addition, such articles exhibit less haze in thermoforming, better scratch resistance, greater toughness, fewer gels, and better optical properties than displayed by similar materials currently available.

Moreover, the capstock resin composition can be feedblock coextruded with ABS or other structural plastics to provide composites wherein the layers are substantially uniform in thickness across the entire sheet, so that edge trimming and recycling into the structural plastic do not adversely affect mechanical properties. Furthermore, such superior coextruded composites comprising ABS and other structural plastics can be produced using standard feedblock coextrusion techniques and equipment presently installed in the industry.

The invention will be more readily understood by reference to the following detailed description.

DETAILED DESCRIPTION

As mentioned above, the essential ingredients comprising the capstock composition of the present invention are a thermoplastic methacrylate-based resin and an acrylate-based, impact-modifier resin. The former resin comprises a continuous phase of the composition and is sometimes referred to herein as "the matrix resin." The composition can include also optional ingredients, as described hereinbelow.

With respect to the matrix resin, it includes several variables which can be adjusted to control the properties of the composition. For example, adjustment of these variables allows the rheological properties of the composition melt, for example, viscosity and melt flow rate (termed herein "melt flow index"), to be matched with the rheological properties of a structural plastic melt. Matching the rheological properties permits coextrusion with conventional equipment of a capstock which is substantially uniform in thickness across its width, a preferred characteristic.

The matrix resin is a thermoplastic resin and comprises polymerized methyl methacrylate or a copolymer prepared by polymerizing a major amount of methyl methacrylate and a minor amount of an alkyl (C1–C4) acrylate, preferably methyl or ethyl acrylate, and, most preferably, ethyl acrylate. Thus, the copolymer can comprise from about 88 to about 99.9 wt. % of the methyl methacrylate and from about 0.1 to about 12 wt. % of the alkyl acrylate. Preferably, the alkyl acrylate content of the copolymer is from about 0.1 to about 4 wt. %, and, most preferably, about 0.4 to about 0.7 wt. %, with the balance of the copolymer comprising methyl methacrylate.

An increase in the alkyl acrylate content of the copolymer increases the melt flow index and decreases the melt viscosity of the copolymer, as well as the resin composition of which it is a part. Minimizing the alkyl acrylate content also increases the hardness, the scratch resistance, and the resistance to attack by chemicals of the capstock.

The molecular weight of the poly(methyl methacrylate-co-alkyl acrylate) copolymer is at least about 125,000 daltons. It can range as high as 220,000 daltons or even higher. Preferably, the molecular weight is from about 135,000 to about 155,000, and most preferably it is from about 140,000 to about 150,000 daltons. Increasing the molecular weight of the copolymer, all else being the same, decreases the melt flow index and increases the melt viscosity of the copolymer and the resin composition of which it is a part. Increasing the molecular weight also improves the chemical resistance of the capstock. It should be appreciated that there are many types of applications which require that the capstock possess good chemical-resistant properties. Accordingly, this is a particularly important and desired property in materials comprising the capstock. As will be seen from examples reported below, capstocks of the present invention have particularly good resistance to chemicals.

In general, the aforementioned copolymer is a random copolymer which is advantageously prepared via free radical-catalyzed bulk polymerization of a mixture of the two monomers, in a continuous flow, stirred tank reactor, with an organic peroxide to about 50% conversion. The polymer-monomer mixture is pumped to a devolatilizing twin-screw extruder where residual monomer is removed and if desired, additives can be added. The technique for conducting this polymerization is described in the literature and is well known to those skilled in the art. The random copolymer can also be prepared by bulk casting, emulsion, or suspension polymerization. The copolymer can be isolated by spray drying or coagulation, washing and the use of drying methods well known in the art.

It should be understood that, for applications in which the resin composition is used to cap ABS or another structural plastic by use of feedblock coextrusion, the relative amount of the matrix resin and either the alkyl acrylate content or the molecular weight of the matrix resin, or both, can be selected, using the guidelines set forth above, to match the rheological properties of the capstock to those of the structural plastic as closely as possible. When this is done, the capstock will be of more uniform thickness, and recycling edge trimmings will not adversely affect the mechanical properties of the composite. For example, if the resin composition is to be coextruded with ABS having a melt flow index (MFI) of about 0.5, the aforesaid parameters can be adjusted to give the resin composition an MFI of from about 0.4 to about 0.75, preferably from about 0.45 to about 0.6 g/10 min. MFI, as used herein in connection with the description of the capstock composition, is evaluated according to the method of ASTM D-1238 (former Condition 1, 230° C./3.8 kg-load) or DIN Method 53735 (230° C./3.8 kg), which methods are essentially identical.

With respect to the acrylate-based impact-modifier resin of the composition of the present invention, it functions primarily to enhance the physical properties of the capstock, for example, toughness and impact resistance. The preparation, blending and use of modifier resins of the type useful in the composition of this invention are well known.

The preferred type of modifier resin for use in the practice of the present invention is described in U.S. Pat. No. 3,793,402 ('402), the content of which is hereby incorporated by reference. As described in the '402 patent, the modifier resin comprises multi-layered polymeric particles. Generally, such resins are prepared by emulsion polymerizing a mixture of monomers in the presence of a previously formed polymeric product. More specifically, such resins are prepared from monomers in aqueous dispersion or emulsion and in which successive monomeric charges are polymerized onto or in the presence of a preformed latex prepared by the polymerization of a prior monomer charge and stage. The polymeric product of each stage can comprise a homopolymer or a copolymer. In this type of polymerization, the polymer of the succeeding stage is attached to and intimately associated with the polymer of the preceding stage.

Such multi-layered polymeric particles comprise three sequential stages of a non-elastomeric first stage polymer, an elastomeric second stage polymer and a relatively hard third stage polymer, with the monomers (co-monomers) used in preparing each stage of the resin being selected, as described in the '402 patent, to provide stages or layers that have the aforementioned non-elastomeric, elastomeric, and hard properties.

As discussed in the '402 patent, the non-elastomeric polymer formed in the first stage of polymerization has a glass transition temperature of greater than 25° C., and it is linked to an elastomeric polymer prepared in a subsequent stage from monomeric constituents such that the glass transition temperature thereof is 25° C. or less, preferably less than 10° C. And such elastomeric polymer is in turn linked to a polymer prepared in a subsequent stage from monomers such that the glass transition temperature of the polymer is preferably greater than 25° C., and most preferably at least about 60° C.

Preferred particles are those in which the core layer and the outer layer thereof comprise resins which are made from the same monomer(s) that are used to prepare the matrix resin of the composition, that is, homopolymers of methyl methacrylate or random copolymers of methyl methacrylate (about 88 to about 99.9 wt. %) and a C1 to C4 alkyl acrylate (about 0.1 to about 12 wt. %), most preferably ethyl acrylate, and allyl methacrylate graft-linking monomer, and optionally, a polyfunctional cross-linking monomer, such as ethylene glycol dimethacrylate. When the matrix resin comprises a copolymer of methyl methacrylate and ethyl acrylate, it is highly preferred that the core and outer layers of the particles comprise about 96 wt. % of methyl methacrylate and about 4 wt. % of ethyl acrylate, with the graft-linking monomer comprising about 1 wt %. In accordance with the teachings of the '402 patent, various types of monomers can be used to prepare the intermediate layer of the particles. An exemplary intermediate layer comprises a random copolymer of butyl acrylate, styrene, and less than about 2 wt. % of the cross-linking and graft-linking monomers.

The product of the sequential stage polymerization comprises a latex, that is, an aqueous composition containing dispersed therein the multi-layered polymeric particles. The particles can be recovered from the latex by spray drying or by coagulation and drying. Spray drying can be advantageously carried out in the presence of a drying aid, for example, an acrylate-based resin which can be the same as or different from the matrix resin described herein. The "drying-aid" resin should, of course, be compatible with the other constituents of the resin composition and not affect adversely the chemical, physical, or aesthetic properties of the composition or articles made therefrom. A preferred "drying-aid" resin comprises a random copolymer of methyl methacrylate and an alkyl (C1 to C4) acrylate which includes about 90 to about 99.9 wt. % of the methyl methacrylate and about 0.1 to about 10 wt. % of the acrylate, preferably ethyl acrylate. The molecular weight of the copolymer can vary over a wide range, for example, about 95,000 to about 200,000 daltons. The molecular weight is preferably about 95,000 to about 110,000 daltons. This resin can remain with the particles where it serves to function as a portion of the matrix resin. Indeed, other thermoplastic acrylic-based resins can also be included in the composition for the purpose of achieving desired effects or functioning as processing aids, for example, high molecular weight methyl methacrylate-ethyl acrylate copolymers having a molecular weight of at least about 1,000,000. Such optional resins can comprise about 1 to about 20 wt. %, preferably about 5 to about 10 wt. %, of the composition of the present invention.

As to the proportions of the matrix and modifier resins comprising the composition of the present invention, it is noted that impact strength increases, but tensile strength and hardness decrease, with increasing modifier resin content. It is believed that for most applications, the matrix resin will comprise from about 40 to about 88 wt. % and the modifier resin will comprise from about 12 to about 60 wt. % of the composition. Preferably, the matrix resin and the modifier resin will constitute respectively from about 50 to about 70 wt. % and from about 30 to about 50 wt. % of the composition.

The capstocks of this invention, in addition to use over ABS and PVC structural plastics mentioned above, may be used over other polymers or structural plastics as described further below. Generally speaking, the best physical properties are obtained with the highest molecular weight consistent with the capability to coextrude the resulting "stiff," or more highly viscous, substrate. Many structural plastics, as exemplified herein, may be suitably modified, such as through molecular weight adjustments or with fillers or by blending with other structural or other plastics, so as to provide physical properties which are not only excellent for the general utility of the structural plastic, such as tensile and impact strengths, but are correspondingly of such stiff, or highly viscous, property to be preferred for use in feedblock coextrusion with the capstocks of this invention. Examples of such other polymers and structural plastics include: polyolefins such as polyethylene and filled polyethylene, polypropylene, polypropylene modified with ethylenepropylene-diene rubber; polypropylene grafted with (meth)acrylic polymers, styrene/(meth)acrylic polymers; polyamides, polyamide/polymer blends, such as polyamide/ABS and polyamide/polycarbonate and the like; styrene/acrylonitrile, styrene/acrylonitrile—multistage polymer blends; polymers of alpha-methylstyrene/acrylonitrile, alpha-methylstyrene/styrene/ acrylonitrile, alpha-methylstyrene/methyl methacrylate/ethyl acrylate; polycarbonate, polycarbonate-ABS blends, polycarbonate-multistage polymer blends; polyesters such as polyethylene terephthalate, polybutylene terephthalate, polybutylene terephthalate-polycarbonate blends, polybutylene terephthalate-polycarbonate copolymer blends; polyvinyl chloride-multistage polymer blends, polyvinyl chloride-(meth)acrylate blends, chlorinated polyvinyl chloride, polyvinyl chloride-ABS blends; acrylonitrile/(meth)acrylate/styrene, polyethylene terephthalate-glycol modified, polyarylate, poly(meth)acrylates, polyacetal, polystyrene and high impact polystyrenes, styrene/maleic anhydride and styrene/maleimide polymers, polyvinylidene fluoride, polyvinylidene fluoride-multistage polymer blends, cellulosics, polyamideimide, polyetheresters, polyetheresteramide and polyetheramide, polyphenylene oxides, and polysulfones. Blends may be prepared from other polymer systems including polyphenylene sulfide, polyphenylene oxide, polysulfone, polyphenylene oxide-styrene blends, polyphenylene oxide-high impact polystyrene blends, polyvinylidene chloride, polyvinylidene chloride/(meth)acrylonitrile, polyvinylidene chloride/(-meth) acrylate, polyvinylidene chloride/polyvinyl chloride blends and copolymers, polyvinyl acetate, polyetheretherketone, polyetherimide, thermoplastic polyimides, polyolefins such as polyethylene, polypropylene, and copolyolefins, and other polymer types. Random or block copolymers which combine different functionalities also can be used, and ternary or higher blends can be made from combinations of these polymer types for use as substrates with the capstocks of this invention.

These polymers and structural plastics may be used singly as the structural plastic with the capstocks of this invention. The polymers and structural plastics and blends may contain acrylic or (meth)acrylic/butadiene/styrene ("MBS") or ethylene/propylene/diene ("EPDM") polymer impact modifiers. They also may incorporate fillers described herein below and they also may be foamed.

The structural plastics and thermoplastic resins exemplified above, when selected for use as substrate materials generally will have their formulations optimized to provide the desired maximum physical properties. Generally this optimization results in highly viscous, that is, low melt flow index, material which optimization dictates the use of the capstock compositions of this invention in providing the substantially improved properties, especially chemical resistance and impact strength, to the resulting coextruded laminate.

As mentioned above, the laminate or capstocked materials of this invention generally are made by feedblock co-extrusion, a preferred method, but other extrusion or casting methods also may be employed, such as press lamination, bi-extrusion, co-calendering, and tri-extrusion which may incorporate an intermediate adhesive or other layer. Even solution casting methods may be used to provide laminated materials of the invention.

In addition to useful articles such as bathtubs, shower stalls, counters, and storage facilities mentioned above which can be fashioned from the plastic composites of this invention, examples of other useful articles include automotive applications such as decorative exterior trim, molding side trim and quarter panel trim panels, fender extensions, louvers, rear end panels, caps for pickup truck back, rearview mirror housings, accessories for trucks, buses, campers, vans, and mass-transit vehicles, b-pillar extensions, and the like; appliances and tools such as lawn and garden implements, bathroom fixtures for mobile homes, fencing, components of pleasure boats, exterior components of mobile homes, lawn furniture such as chair and table frames, pipe and pipe end caps, luggage, shower stalls for mobile homes, toilet seats, signs, spas, air conditioner and heat pump components, kitchen housewares, bead-molded picnic coolers, picnic trays and jugs, and trash cans; venetian blind components; sporting goods such as sailboards, sailboats; plumbing parts such as lavatory parts and the like; construction components, in addition to those mentioned previously, the additional components including architectural moldings, door molding, louvers, and shutters, mobile home skirting, patio doors, siding accessories, window cladding, storm window frames, skylight frames, end caps for gutters, awnings, car port roofs, and the like.

Optional ingredients that may be used in the composition of the present invention, either in the capstock or in the structural plastic or in both, are color concentrates, for example, dyes and pigments, lubricants, UV stabilizers, thermal stabilizers, antioxidants, heat distortion temperature improvers, antistatic agents, physical or chemical blowing agents, nucleating agents, matting agents, flame retardants, and processing aids. In general, the total amount of such optional ingredients will generally not exceed about 5 wt. % of the composition, for example, about 1 to about 5 wt. % of such ingredients. Additionally, fillers such as wood fibers, carbon fibers, glass fibers, glass beads, and minerals such as calcium carbonate, talc, titanium dioxide, barium sulfate, and the like optionally may be included in the composition of the present invention. The total amount of such optional fillers will generally not exceed about 15 weight % in the capstock and about 65 weight % in the structural plastic or substrate.

The following examples are illustrative of the invention but are not intended to be exhaustive or to limit the invention to the precise form disclosed. Many other variations and modifications are possible in light of the specification and examples:

EXAMPLES

Example 1. Preparation of Resin Composition of Invention

A pelletized matrix resin random copolymer (10 lbs.) of 99.4 wt % methyl methacrylate and 0.6 wt % ethyl acrylate with a molecular weight of 145,000 daltons, prepared in a continuous flow, stirred tank reactor, and extruded by conventional methods, is mixed by manual agitation in a polyethylene bag with an equal amount by weight of a powdered modifier resin.

The modifier resin comprises polymeric particles having three layers prepared by the procedure described in aforementioned U.S. Pat. No. 3,793,402. The core layer and outer layer comprise random copolymers of approximately 96 wt % methyl methacrylate and about 4 wt % ethyl acrylate, with the core layer copolymer being graft linked with about 1 wt. % allyl methacrylate. The intermediate layer is a random copolymer of about 80 wt % butyl acrylate and 18 wt % styrene graft linked with about 2 wt. % allyl methacrylate. The modifier resin has a particle size of from about 250 to about 350 nanometers and is admixed with a random copolymer comprising 96 wt % methyl methacrylate and 4 wt % ethyl acrylate having a molecular weight of about 95,000 daltons. The proportions of the copolymer and the modifier resin in the admixture are respectively 16 wt. % and 84 wt. %. Thus, the modifier resin comprised about 42 wt. % of the composition and the random copolymer about 8 wt. % of the composition.

The resulting powder/pellet dryblend is fed to a single screw extruder (25 mm diameter; 600 mm screw effective length) in which the dryblend is melted and dispersively mixed. Barrel temperatures from the feed zone to the die zone are in the range 204° C./227° C./243° C.; the die temperature is controlled at about 230° C. The melt is extruded as a strand, cooled in water, and then cut into pellets. An alternative method is to pass the dryblend through a corotating, intermeshing twinscrew extruder (30 mm diameter; 720 mm effective length of screws), rather than a single screw extruder.

Example 2

Preparation of Laminate Including Capstock

The batch of pellets formed from the composition of Example 1 is used to produce a 2-layered impact-modified acrylic/ABS sheet.

The equipment used to produce the sheet consists of an extruder to melt and pump each material (the acrylic resin composition of Example 1 and the ABS resin), a combining feedblock to combine the two melt streams from the extruders, and a conventional single-manifold sheet die from which the two-layer extrudate exits onto conventional 3-roll stack polishing unit, cooling rack, and pull rolls. This equipment is well known in the art (for example, see Nissel, *Advances in Plastics Technology*, October 1981).

The equipment is heated to desired operating temperatures and then the secondary (smaller) extruder for the acrylic resin composition is started. After running acrylic resin composition long enough to fill the feedblock and die, the primary extruder for the ABS substrate material is started. With both melts exiting the die together, the sheet line is strung up in the usual fashion with screw speeds and line speeds gradually increased and various adjustments made to produce the desired layer thickness combination at the desired output rate.

Resin compositions of this invention also can be extruded or injection molded into monolithic sheet and film stock using conventional methods well known in the art. The use of monolithic sheet prepared by these methods permits the straight forward determination of capstock properties by test procedures developed for sheet products.

Example 3

Evaluation of Properties of Capstocks

The first two groups of tests reported below illustrate the excellent chemical resistance of materials of Example 2 formed from a composition within the scope of the present invention, namely, the composition of Example 1 above.

Unless indicated otherwise, chemical resistance is determined quantitatively on pieces of a 3.2 mm extruded sheet (the test samples) formed in Example 2 from the compositions of Example 1. The test samples are cut from the extruded sheet into 5 by 6 cm pieces. The samples are put into fixtures designed to impose 1% strain and allowed to equilibrate for five minutes under ambient conditions, after which the strain relative to the direction of extrusion (parallel or perpendicular) is noted. The fixtures are strips of stainless steel, of approximately 10×2×0.4 cm dimension, fitted with end clamps capable of firmly securing the test pieces. The steel strips are preformed to match a calculated radius of curvature which yields the strain desired according to the following formula: percent strain=thickness of test sample/2×radius. Thus, for test samples of 3.2 mm thickness, the radius of curvature of the fixture for producing a defined 1% strain is 15.55 cm.

Two drops of isopropyl alcohol (or other reagent, as indicated hereafter) are placed on the crowned surface of the strained sample. When the reagent is applied, the time is noted. When a craze line appears, the time in seconds is recorded. Five samples of each material with each reagent are tested and the times to craze are averaged and reported.

Table 1 below includes the results of the evaluation which demonstrates the resistance to crazing of samples made from the composition of this invention (Example 1).

TABLE 1

| Reagent | Resistance to Crazing Test | |
|---|---|---|
| | Strain/Extrusion Direction | Time to Craze, secs. for samples of Ex. 1 Comp. |
| isopropanol | parallel | 87 seconds |
| isopropanol | perpendicular | 24 seconds |
| LYSOL ®* | parallel | 86 seconds |
| LYSOL ® | perpendicular | 88 seconds |
| isopropanol** | parallel | 374 seconds |
| isopropanol** | perpendicular | 220 seconds |

*A commercial disinfectant containing ortho-phenyl-phenol active ingredient (0.1%) in ethyl alcohol (79%) and inert ingredients (20.9%)
**Test samples were capstock of 0.5 mm thickness on substrate of ABS (Monsanto Lustran ABS 752) of 2 mm thickness, coextruded as described hereinabove The second test shows the extent to which the optical properties of test samples made from the composition of Example 1 resist being degraded when subjected to heated water for extended periods of time. The test results reported in Table 2 below include data respecting transmission and haze properties for injection molded plaques after immersion in heated distilled water maintained at 70° C. for the number of days indicated in Table 2. Total white light transmission (TWLT) and haze are measured according to ASTM Test Method D-1003 on duplicate samples, the values of which were averaged.

TABLE 2

Optical Property Test

| Days of Immersion in Water (70° C.) | % TWLT(1) Composition of Ex. 1 | Optical Property Values % Haze(2) Composition of Ex. 1 |
|---|---|---|
| Pre-immersion | 90.8 | 2.9 |
| 1 day | 87.2 | 6.5 |
| 3 days | 85.3 | 8.1 |
| 14 days | 78.0 | 16.6 |
| 35 days | 75.5 | 19.4 |

(1) Percent total white light transmission test, ASTM D-1003
(2) Percent haze test, ASTM D-1003

The next test in Table 3 shows that the remarkably improved chemical-resistant properties of articles made from the composition of Example 1 are not achieved at the expense of a loss in other important properties of the article.

TABLE 3

| Property | ASTM Method | Values for Materials Made from Comp. of Ex. 1 |
|---|---|---|
| Optical: | | |
| Refractive Index | D-542 | 1.49 |
| Light Transmittance | D-1003 | |
| 3.2 mm Total White | | 90% |
| Haze | | 3% |
| Mechanical: | | |
| Tensile | D-638 | |
| Yield strength | | 37.9 M Pa. |
| Break strength | | 37.2 M Pa. |
| Break elongation | | 35% |
| Modulus of elasticity | | 1724 M Pa. |
| Flexural | D-790 | |
| Modulus of elasticity | | 1861 M Pa. |
| Impact | D-256 | |
| Izod, Notched Impact at 73° F. | | 64 J/M |
| Rockwell Hardness | D-955 | 47 M |

The data in Table 4 show the improved thermal properties, as measured by deflection temperature under load, of injection molded bars of capstock materials. Melt flow measurements of the same type materials are included also.

TABLE 4

Thermal and Melt Flow Data

| Property | Test Method | Samples Made from Comp. of Ex. 1 |
|---|---|---|
| Thermal | | |
| Deflection Temp. Under Flexural Load | ASTM D-648 | |
| At 1.82 M Pa. annealed at 82° C. | | 85° C. |
| At 1.82 M Pa., unannealed | | 80° C. |
| Melt Flow Rate | | |
| Condition I | ASTM D-1238 (g/10 min.) | 0.6 |

Examples of other resin composition within the scope of this invention and which can be prepared in the manner used to prepare the composition of Example 1 are described in Table 5 below. In each Example, the polymeric particles comprising the modifier resin are the same as those used in the composition of Example 1. The amount of "Modifier Resin/Copolymer Admixture" comprising the compositions of each of Examples 4, 5, 6, 7 and 8 of Table 5 is as indicated in Table 5, with the Admixture of each of Examples 4, 5, 6 and 8 comprising: 84 wt. % of the modifier resin; 10 wt. % of a random copolymer having a molecular weight of about 95,000 daltons and containing about 96 wt. % of methyl methacrylate and about 4 wt. % of ethyl acrylate; and about 6 wt. % of a high molecular weight acrylic copolymer having a molecular weight of about 2,000,000 and comprising about 90 wt. % of methyl methacrylate and about 10 wt. % of ethyl acrylate (processing aid). Example 8 is a blend of 88 weight % of the matrix resin of Example 7 and 12 weight % of the modifier resin/copolymer admixture as described immediately above.

TABLE 5

| Ex. | Matrix Resin | Modifier Resin/ Copolymer Admixture |
|---|---|---|
| 4 | 60 wt % of matrix resin of Ex. 1 | 40 wt % of blend modifier resin/copolymer admixture as described above |
| 5 | 50 wt % of a copolymer of 96 wt % MMA & 4 wt. % of EA, mol wt. 145,000 | 50 wt % of blend of modifier resin/copolymer admixture as described above |
| 6 | 50 wt % of a copolymer of 90 wt. % MMA & 10 wt. % of EA, mol. wt. 200,000 | 50 wt % of blend of modifier resin/copolymer admixture as described above |
| 7 | 50 wt % of a copolymer of 93 wt. % MMA & 7 wt. % EA, mol. wt. 200,000 | 50 wt % of blend of modifier resin/copolymer admixture of Ex. 1 |
| 8 | 88 wt % of matrix resin of Ex. 7 | 12 wt % of blend of modifier resin/copolymer admixture as described above |

(a) MMA = methyl methacrylate; EA = ethyl acrylate

The melt flow indexes (MFI) of the resin compositions of Examples 4 and 5 are the same as that of Ex. 1 (0.6), while the MFI of the resin compositions of each of Examples 6 and 7 is about 0.7 g/10 min. The MFI of Example 8 is about 0.7/10 min. These MFI's substantially match that of ABS under the preferred feedblock coextrusion conditions for improved properties as described above.

In summary, it can be said that the present invention provides an improved capstock composition and a composition which is capable of being effectively formed into an article, particularly a laminate, which has excellent properties, including particularly, excellent chemical-resistant properties.

What is claimed is:

1. A method for preparing a plastic composite comprising capstock overlying and integrally bonded to an underlying structural ply, wherein said composite is formed by feedblock coextrusion of a molten capstock composition and a molten structural ply composition, the improvement comprising:
   forming by feedblock coextrusion the composite from the capstock composition comprising
   (A) about 40 to about 88 wt. % of a thermoplastic resin having a molecular weight of at least about 125,000 daltons, and selected from the group consisting of methyl methacrylate resin and a copolymer of methyl methacrylate and a $C_1$ to $C_4$ alkyl acrylate, and
   (B) about 12 to about 60 wt. % of an acrylate-based impact-modifier resin in the form of discrete multi-layer polymeric particles, wherein the composition has a melt flow index of from about 0.4 to about 0.75, as measured by ASTM Method D-1238, Condition I, and wherein the discrete multi-layered polymeric particles are dispersed in the thermoplastic resin which constitutes a continuous phase of the composition;

and from a structural ply composition having substantially the same melt flow index as that of the capstock composition.

2. The method of claim 1 wherein the thermoplastic resin consists essentially of a copolymer of about 0.1 to about 12 wt. % of alkyl acrylate and about 88 to about 99.9 wt. % of methyl methacrylate.

3. The method of claim 2 including about 0.1 to about 4 wt. % of alkyl acrylate and about 96 to about 99.9 wt. % of methyl methacrylate.

4. The method of claim 2 wherein the molecular weight is no greater than about 220,000 daltons and the melt flow index is about 0.45 to about 0.6.

5. The method of claim 2 wherein the impact-modifier resin comprises multi-layered polymeric particles having an intermediate layer sandwiched between a core layer and an outer layer, the core layer being a non-elastomeric polymer, the intermediate layer being an elastomeric polymer, and the outer layer being a hard polymer.

6. The method of claim 5 wherein each of the core and outer layers comprises random copolymers of methyl methacrylate and ethyl acrylate and the intermediate layer comprises a random copolymer of butyl acrylate and styrene.

7. The method of claim 2 wherein a source of the impact-modifier resin is an admixture which includes a drying aid resin comprising a random copolymer of about 90 to about 99.9 methyl methacrylate and about 0.1 to about 10 wt. % of an alkyl acrylate having a molecular weight of about 95,000 to about 200,000 daltons.

8. The method of claim 1 wherein the structural ply composition is selected from ABS, polycarbonate, polycarbonate-ABS blends, or PVC.

9. The method of claim 1 wherein the capstock composition overlies a mutually compatible polymer interlayer integrally bonded to the underlying structural ply.

10. The method of claim 9 wherein the mutually compatible polymer interlayer is ABS and the underlying structural ply is high impact polystyrene.

11. The method of claim 9 wherein the mutually compatible polymer interlayer is a propylene polymer grated with methyl methacrylate and the underlying structural ply is polypropylene.

* * * * *